No. 769,789. PATENTED SEPT. 13, 1904.
W. D. COTTRELL.
TRACTION WHEEL.
APPLICATION FILED NOV. 2, 1903.
NO MODEL.
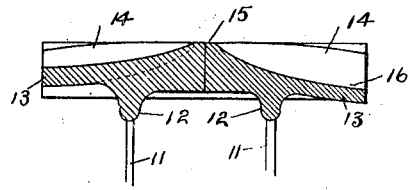
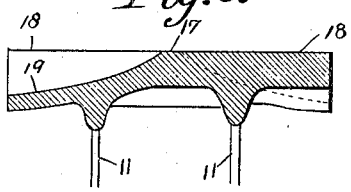
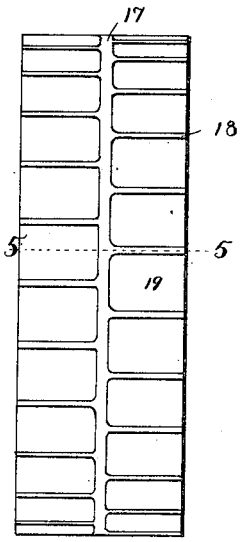
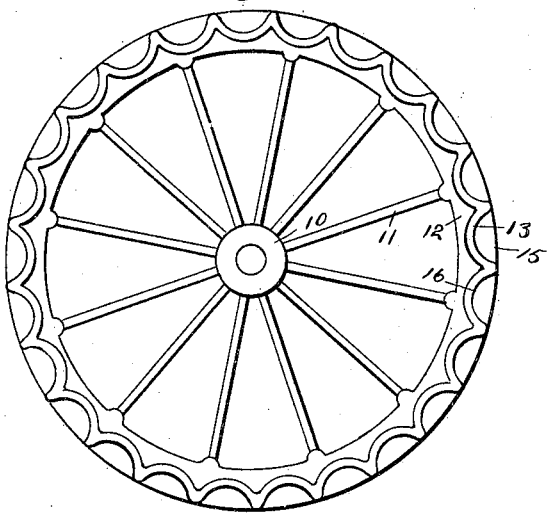
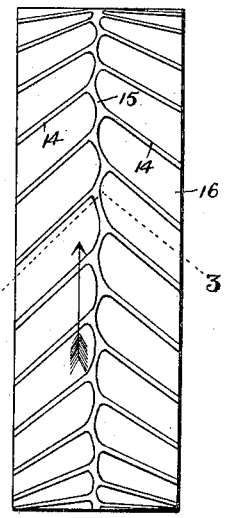
Witnesses
Inventor W. D. Cottrell.
By Irving & Lane attys No. 769,789. Patented September 13, 1904.

UNITED STATES PATENT OFFICE.

WARREN D. COTTRELL, OF LAURENS, IOWA.

TRACTION-WHEEL.

SPECIFICATION forming part of Letters Patent No. 769,789, dated September 13, 1904.

Application filed November 2, 1903. Serial No. 179,493. (No model.)

*To all whom it may concern:*

Be it known that I, WARREN D. COTTRELL, a citizen of the United States, residing at Laurens, in the county of Pocahontas and State of Iowa, have invented certain new and useful Improvements in Traction-Wheels, of which the following is a specification.

The objects of my invention are to provide a traction-wheel having on its tread portion ribs and tapered grooves so arranged that when traveling over soft or yielding earth or snow the ribs will engage the surface in such manner as to prevent the wheel from slipping either circumferentially or laterally and the grooves between the ribs will cause the soft or yielding earth or snow to be pushed laterally in both directions from the center of the wheel to thereby prevent earth or snow from filling up the grooves and adhering to the tread of the wheel.

A further object is to provide a wheel of this class in which the tread portions of the ribs present a flat surface, so that when the wheel is traveling over a hard road or a flat floor the weight of the wheel will be distributed over the entire tread portion; and a further object is to so arrange the ribs as to give a maximum of strength to the wheel-rim.

My invention consists in the construction, arrangement, and combination of the ribs and tapered grooves on the tread portion of the wheel whereby the objects contemplated are attained, as hereinafter more fully set forth, pointed out in my claim, and illustrated in the accompanying drawings, in which—

Figure 1 shows a side elevation of my improved traction-wheel. Fig. 2 shows an edge view of same. Fig. 3 shows a transverse sectional view on the indicated line 3 3 of Fig. 2. Fig. 4 shows an edge view of a modified form of the wheel, and Fig. 5 shows an enlarged sectional view on the indicated line 5 5 of Fig. 4.

Referring to the accompanying drawings, I have used the reference-numeral 10 to indicate the wheel-hub, and 11 the spokes radiating from the hub. These spokes are united or attached to two annular ribs 12, formed on the inner periphery of the wheel-rim. This part of the device is of ordinary construction. The reference-numeral 13 indicates the wheel-rim, preferably cast integral with the ribs 12. In its periphery or tread portion I have provided a series of ribs 14, extending from one edge of the rim in a diagonal direction to the center of the rim, at which point it unites with a rib 15, extending completely around the wheel, on the tread portion thereof, and in the center of the rim. The outer faces of the ribs 14 are flat and parallel with the hub 10, so that when the wheel rests upon a flat surface the entire outer faces of the lower ribs will rest upon the flat surface. Furthermore, the ribs 14 on one side of the central rib are staggered with relation to those on the other side, and the ribs on one side join with the central rib 15 at points midway between the points where the ribs on the other side join with said central rib 15. Between each pair of the ribs 14 is a tapered groove 16, the maximum depth of said groove being greatest at the edge of the rim and tapering to a minimum at the center of the rim. In other words, the bottom of the groove 16 is inclined and curved to meet the top of the central rib 15, as clearly shown in Fig. 3. These grooves 16 are deepest along their longitudinal center, and the bottoms of the grooves are curved gradually and uniformly toward the tops of the adjacent ribs 14, as clearly shown in Fig. 1.

In practical use with my improved form of traction-wheel and assuming that the wheel is passed over soft or yielding earth or snow and assuming the wheel to be rotated in the direction indicated by the arrow in Fig. 2 it is obvious that said ribs will tend to prevent the wheel from slipping relative to the surface on which it is traveled either circumferentially or laterally, as the said ribs form substantially V-shaped figures on the surface over which the wheel is rolling. The ribs 14 by projecting from the face of the wheel cut into the surface over which the wheel is passing and prevent circumferential slipping, while the inclined portions of the ribs, together with the central rib 15, both tend to prevent lateral slipping of the wheel. However, if the bottoms of the grooves between the ribs were of the same depth throughout the entire width of the rim then there would be a tendency for the soft earth or snow to fill up the spaces between ribs and pack tightly therein, thus supporting the weight of the wheel upon the soft earth or snow in said grooves and preventing the ribs from penetrating the surface. To avoid this difficulty, I have tapered the bottoms of the grooves from a maximum depth at their outer ends to a minimum where they join the central rib 15, so that the weight of the wheel pressing downwardly upon the soft or yielding earth or snow tends to force that portion of the earth or snow in said grooves toward the outer edges of the wheel, thus making the wheel self-clearing and preventing earth and snow from filling up the grooves and from adhering to the tread portion of the wheel. The tapered bottoms of the grooves 16 also aid in preventing lateral movements of the wheel, as they provide a lateral pressure upon the wheel which is equalized on both sides of the wheel-rim, the tendency on each side being to force the wheel toward the side opposite. By arranging the ribs and grooves in staggered positions I gain an additional advantage in that the central portions of the bottoms of the grooves may extend to a central line on the wheel, and at the same time a central rib is provided. If the ribs 14 on opposite sides join at their inner ends, then of course the width of the central rib 15 would prevent the bottoms of the grooves from reaching an approximately central line around the periphery of the wheel. In the event that pieces of soft earth or mud containing grass or roots should become lodged in the grooves 16 and extend across the entire face of the wheel then the central rib is of material advantage in that the grass or roots passing from one of the grooves 16 to the adjacent groove on the opposite side would be cut off by the pressure of said central rib 15 upon the earth's surface as the wheel revolves, and then the portions of the mass of earth could be forced outwardly from both sides of the wheel-rim after the grass or roots in the center had become severed by said rib.

In the modified form shown in Fig. 4 of the drawings I have illustrated a wheel-rim having a central rib 17 extending around the periphery of the wheel and a number of transverse ribs 18 at right angles to the central rib 17. The ribs 18 on opposite sides of the central rim are in staggered positions and the groove 19 between each pair of ribs 18 is tapered from a maximum at its outer end to a minimum where it joins the central rib 17. This construction is clearly shown in Figs. 4 and 5, and in practical use the tapered bottoms of the grooves serve the same function as in my preferred form before described.

Having thus described my invention, what I claim, and desire to secure by Letters Patent of the United States therefor, is—

An improved traction-wheel, comprising a rim, a rib extending circumferentially around the center of the rim, ribs extending from the central rib outwardly to the edges of the rim, the outer faces of all of said ribs flush and parallel with the axis of the wheel, said rim formed with tapered recesses between the outwardly-projecting ribs deepest and widest at the edges of the rim and gradually curved to meet the top of the central rim, said recesses also curved to meet the tops of the adjacent outwardly-extended ribs.

WARREN D. COTTRELL.

Witnesses:
B. L. SAUM,
WM. HILSSON.